US011633631B1

United States Patent
Cunningham et al.

(10) Patent No.: US 11,633,631 B1
(45) Date of Patent: Apr. 25, 2023

(54) ACTIVATION ASSEMBLY WITH SHAPE MEMORY ALLOY (SMA) FOR A SEALED CONTAINER

(71) Applicant: AVOX SYSTEMS INC., Lancaster, NY (US)

(72) Inventors: Adam Cunningham, Lancaster, NY (US); Mark Zafron, Lancaster, NY (US); Derrek Greene, Lancaster, NY (US)

(73) Assignee: AVOX SYSTEMS INC., Lancaster, NY (US)

( * ) Notice: Subject to any disclaimer, the term of this patent is extended or adjusted under 35 U.S.C. 154(b) by 0 days.

(21) Appl. No.: 17/482,778

(22) Filed: Sep. 23, 2021

(51) Int. Cl.
*A62B 7/08* (2006.01)
*F03G 7/06* (2006.01)
*A62B 7/14* (2006.01)
*F16K 17/40* (2006.01)

(52) U.S. Cl.
CPC .............. *A62B 7/08* (2013.01); *A62B 7/14* (2013.01); *F03G 7/064* (2021.08); *F03G 7/06143* (2021.08); *F16K 13/04* (2013.01); *B64D 2231/02* (2013.01)

(58) Field of Classification Search
CPC ......... F03G 7/0614–0615; F03G 7/065; F16K 13/04
See application file for complete search history.

(56) References Cited

U.S. PATENT DOCUMENTS

| 1,159,417 | A | * | 11/1915 | Revelli | F41A 3/82 |
| | | | | | 89/198 |
| 6,279,869 | B1 | | 8/2001 | Olewicz | |
| 6,494,225 | B1 | | 12/2002 | Olewicz et al. | |
| 2014/0339265 | A1 | * | 11/2014 | Marone | A47L 15/4463 |
| | | | | | 337/140 |
| 2022/0055722 | A1 | * | 2/2022 | Gummin | F03G 7/06143 |

FOREIGN PATENT DOCUMENTS

| FR | 2685079 A1 * | 6/1993 | .............. F42B 39/20 |
| JP | 61174956 | 10/1986 | |
| JP | 63214267 | 9/1988 | |
| JP | 09266956 A * | 10/1997 | |

OTHER PUBLICATIONS

International Application No. PCT/US2022/041224, International Search Report and Written Opinion dated Nov. 15, 2022, 12 pages.

* cited by examiner

*Primary Examiner* — Laert Dounis
(74) *Attorney, Agent, or Firm* — Kilpatrick Townsend & Stockton LLP

(57) ABSTRACT

An activation assembly for a sealed container includes a striker, a detent, and a shape memory alloy (SMA) wire connected to the detent. The SMA wire may move the detent from a first position to a second position relative to the striker based on activation of the SMA wire where, in the first position, the detent is engaged with the striker, and, in the second position, the detent is disengaged from the striker and the striker is movable from a stowed position to a deployed position.

11 Claims, 4 Drawing Sheets

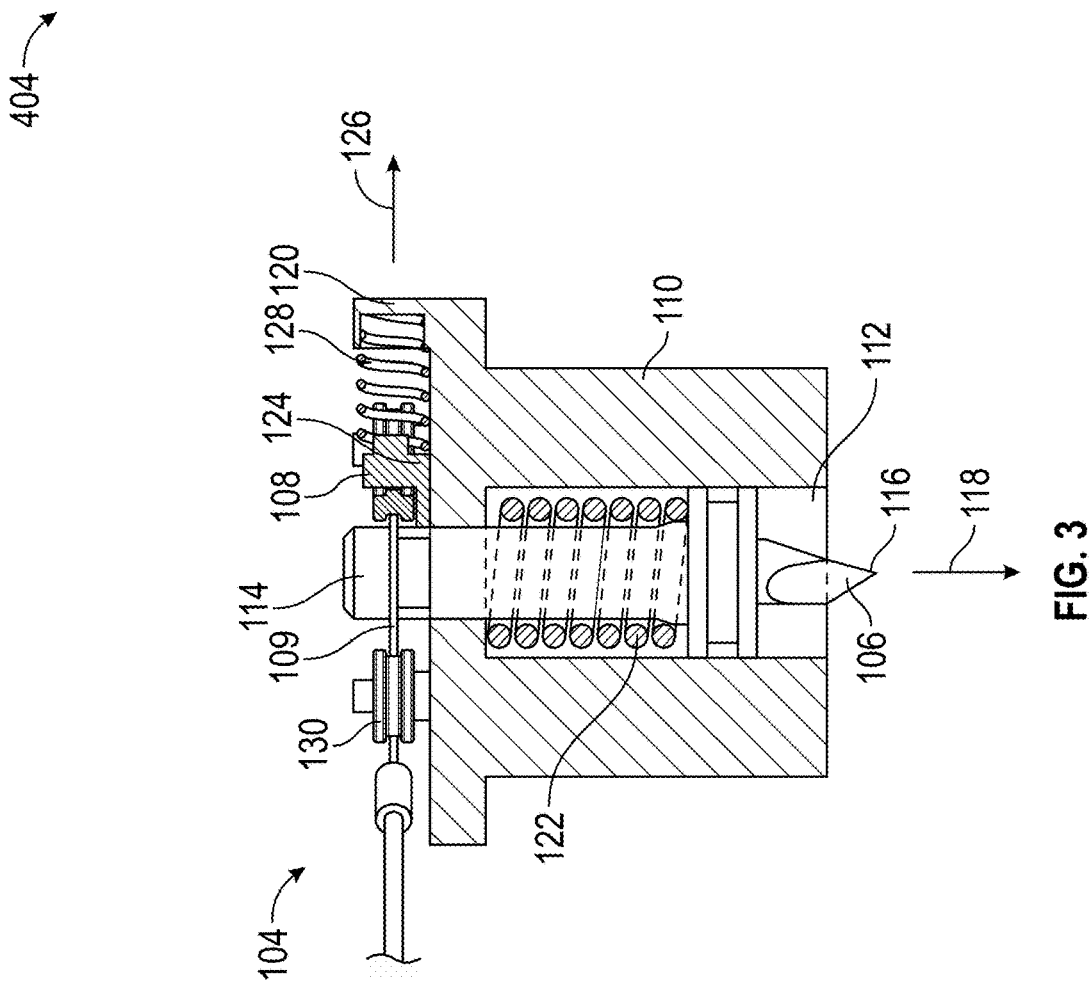
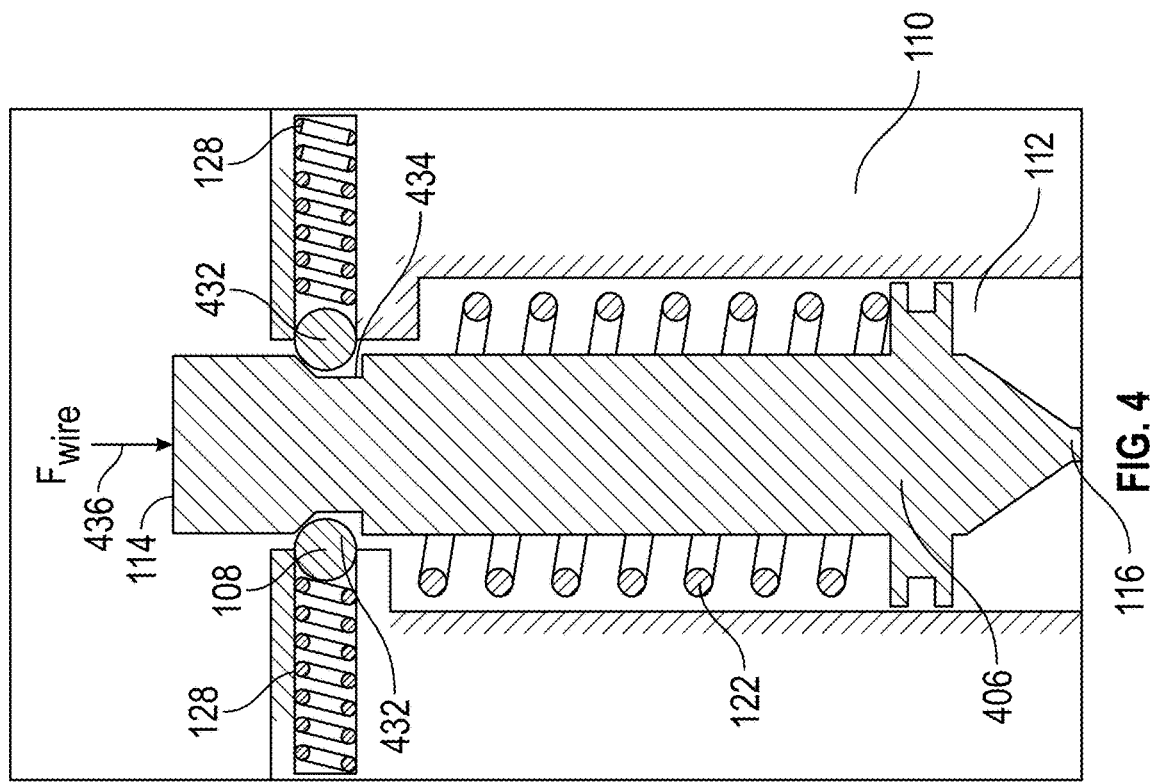
FIG. 3
FIG. 4

ACTIVATION ASSEMBLY WITH SHAPE MEMORY ALLOY (SMA) FOR A SEALED CONTAINER

FIELD OF THE INVENTION

The field of the invention relates to activation assemblies for sealed containers, and, more particularly, to activation assemblies for sealed containers including but not limited to aviation compressed gaseous oxygen systems and chemical oxygen generators.

BACKGROUND

Sealed containers are used in many environments and for a variety of purposes, including but not limited to storing breathing oxygen in aircraft. In certain embodiments, it may be desirable to open and/or otherwise activate the sealed container. For example, in aviation, sealed containers may be used for compressed gaseous oxygen systems and/or chemical oxygen generators, and the containers may need to be selectively ruptured and/or activated to provide a supply of oxygen to a user (e.g., a passenger). Traditionally, such systems have been manually activated and require a passenger to pull an oxygen mask to initiate gas flow, which is an additional task for passengers to perform.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, an activation assembly for a sealed container includes a striker, a detent, and a shape memory alloy (SMA) wire connected to the detent. The SMA wire is configured to move the detent from a first position to a second position relative to the striker based on activation of the SMA wire, where, in the first position, the detent is engaged with the striker, and, in the second position, the detent is disengaged from the striker and the striker is movable from a stowed position to a deployed position.

In certain embodiments, the activation assembly includes a biasing member biasing the striker towards the deployed position, and, in the first position, the detent retains the striker in the stowed position.

In some embodiments, the detent includes a slider, and the slider is linearly movable between the first position and the second position relative to the striker based on activation of the SMA wire. Optionally, a slider biasing member may bias the slider towards the first position. In various examples, the slider is linearly movable in a direction perpendicular to a direction of movement of the striker from the stowed position to the deployed position. In some embodiments, a plurality of pulleys may support the SMA wire.

In various embodiments, the detent includes a pair of rails, and the rails are rotatable relative to the striker based on activation of the SMA wire. In some cases, the activation assembly includes a slider that is linearly movable relative to the rails. The slider may retain the rails in the first position, and the slider may be linearly moved based on activation of the SMA wire such that the slider disengages the rails and the rails move to the second position. In various cases, the slider moves the rails to the second position. Optionally, the rails may be biased away from the striker. In various embodiments, each rail of the pair of rails is rotatable about an axis offset from the striker.

In some embodiments, the detent includes a bearing ball and a biasing member biasing the bearing ball towards the first position. In some cases, the striker includes a groove, and the bearing ball is configured to engage the groove on the striker in the first position.

In certain embodiments, the detent includes a linkage arm having an inflection point.

In various embodiments, a sealed container system includes the sealed container and the activation assembly. In certain aspects, the sealed container optionally may be at least one of a chemical oxygen generator or a sealed gas cylinder.

According to certain embodiments of the present invention, an activation assembly for a sealed container includes a striker movable between a stowed position and a deployed position and a biasing member biasing the striker towards the deployed position. The activation assembly also includes a detent configured to engage the striker and retain the striker in the stowed position. In various embodiments, the activation assembly includes a SMA wire connected to the detent and that is adjustable between an activated configuration and a deactivated configuration. In certain embodiments, in the activated configuration, the SMA wire disengages the detent from the striker such that the biasing member moves the striker from the stowed position to the deployed position.

In some embodiments, the detent includes a slider that is linearly movable relative to the striker and in a direction perpendicular to the direction of movement from the stowed position to the deployed position of the striker.

In various embodiments, the detent includes at least one of a rotatable rail, a biased ball detent, or a linkage arm comprising an inflection point.

According to certain embodiments of the present invention, an activation assembly for a sealed gas container or a chemical oxygen generator includes a striker, a detent, and a SMA wire connected to the detent. The SMA wire may selectively move the detent relative to the striker, where, in a deactivated configuration of the SMA wire, the detent is engaged with the striker, and, in an activated configuration of the SMA wire, the detent is disengaged from the striker.

In certain embodiments, the striker is movable between a stowed position and a deployed position. The activation assembly may include a biasing member that biases the striker towards the deployed position, and, in the deactivated configuration, the detent is engaged with the striker such that the striker is retained in the stowed position.

Various implementations described herein can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The specification makes reference to the following appended figures, in which use of like reference numerals in different figures is intended to illustrate like or analogous components.

FIG. 3 is a sectional view of the activation assembly of FIG. 1.

FIG. 4 is a sectional view of an activation assembly for a sealed container according to certain embodiments of the present invention.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. Directional references such as "up," "down," "top," "bottom," "left," "right," "front," and "back," among others, are intended to refer to the orientation as illustrated and described in the figure (or figures) to which the components and directions are referencing. This description should not be interpreted as implying any particular order or arrangement among or between various steps or elements except when the order of individual steps or arrangement of elements is explicitly described.

The described embodiments of the invention provide activation assemblies for sealed containers, including but not limited to chemical oxygen generators and compressed gaseous oxygen systems. While the activation assemblies are discussed for use with chemical oxygen generators and compressed gaseous oxygen systems, and particularly for use in aviation, they are by no means so limited. Rather, embodiments of the activation assemblies may be used with sealed containers of any type or otherwise as desired.

Figure 1:
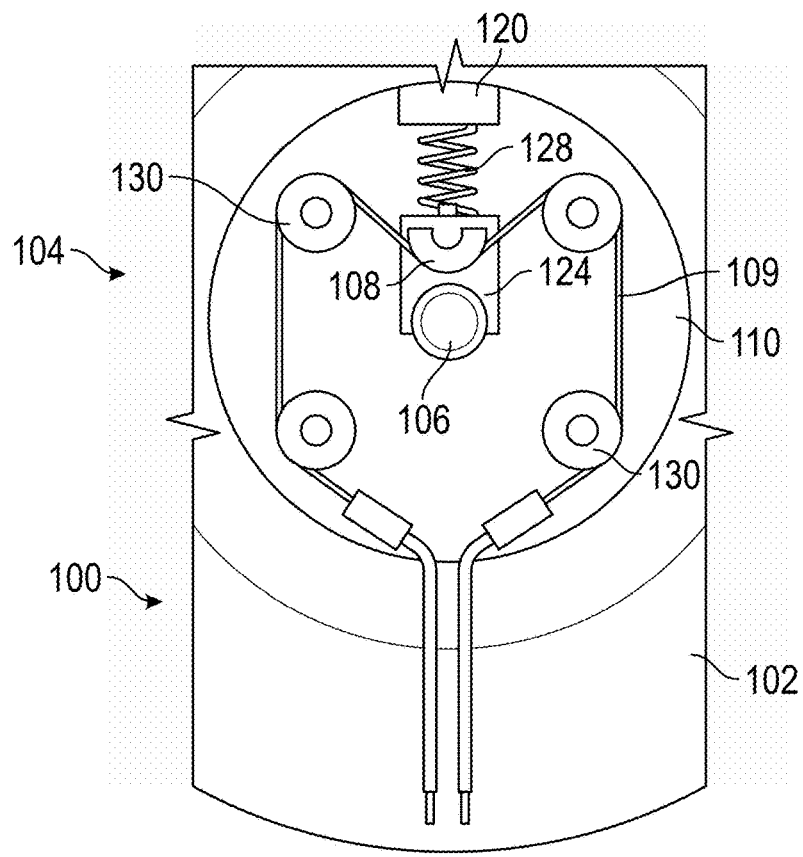
FIG. 1 is a top view of a sealed container with an activation assembly according to certain embodiments of the present invention.

According to certain embodiments of the present invention, as shown in FIG. 1, a sealed container system 100 includes a container 102 and an activation assembly 104. The container system 100 and any sub-components may be formed of materials including but not limited to aluminum, stainless steel, aramid fibers, polycarbonate, polypropylene, other metallic materials, composite materials, combinations thereof, or other suitable materials as desired. The container 102 may be various sealed containers as desired, including but not limited to a chemical oxygen generator or a sealed container for compressed gaseous oxygen systems for aircraft. The activation assembly 104 may be provided on a holder 110, which may be a separate component that is attached to the container 102 and/or a portion of the container 102 itself. In one non-limiting example, the holder 110 may be a mounting flange or mounting support that mounts the activation assembly 104 on the container 102. Optionally, and as illustrated in FIG. 3, the holder 110 may include an interior passage 112 that at least partially receives a portion of the activation assembly 104. However, the particular holder 110 illustrated should not be considered limiting on the disclosure.

The activation assembly 104 generally includes a striker 106, a detent 108, and a SMA wire 109. The activation assembly 104 may optionally include additional features as discussed in detail below.

The striker 106 of the activation assembly 104 is configured to selective engage the sealed container 102 to cause activation and/or opening of the sealed container 102. As a non-limiting example, if the container 102 is a sealed container for compressed gaseous oxygen systems, the striker 106 may selectively engage the container 102 to rupture or otherwise open the container 102. As another non-limiting example, if the container 102 is a chemical oxygen generator, the striker 106 may be a firing plunger that selectively engages a primer cap to start a chemical reaction that generates oxygen.

Figure 2:
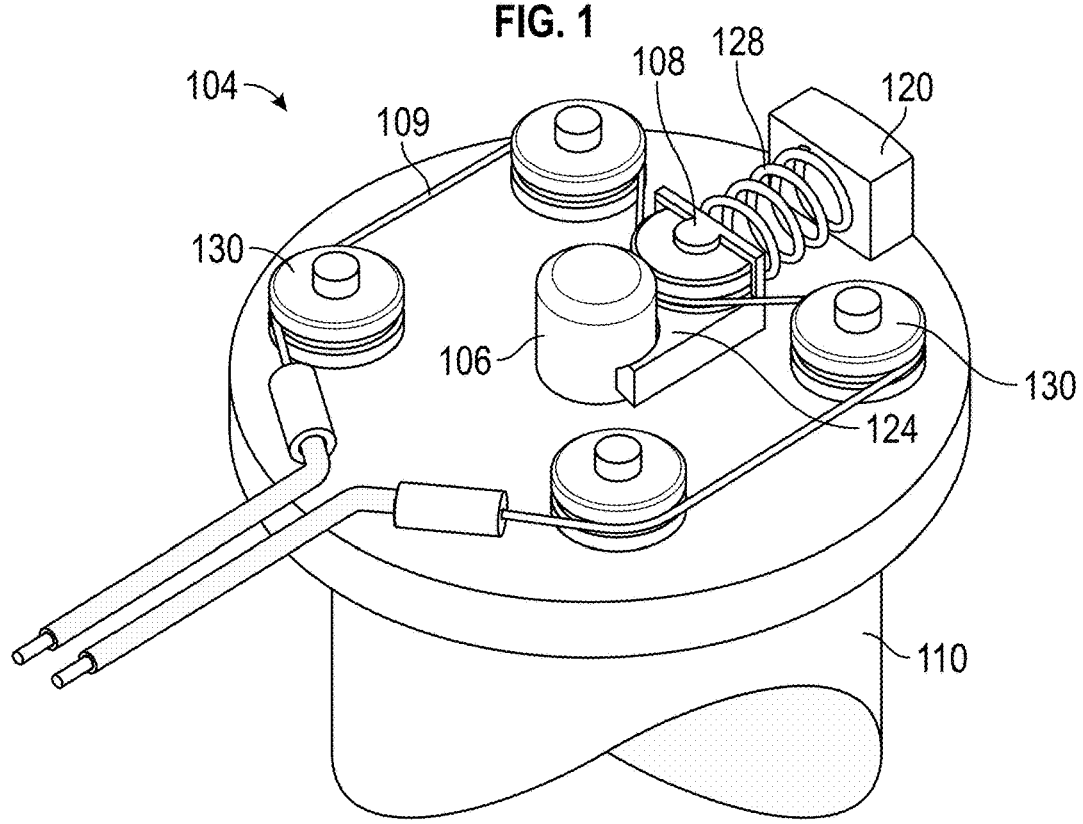
FIG. 2 is a perspective view of the activation assembly of FIG. 1.

In various embodiments, and as best illustrated in FIG. 3, the striker 106 includes a first end 114 and a second end 116. The striker 106 may be at least partially positioned within the interior passage 112. In various embodiments, the striker 106 is movable between a stowed position and a deployed position. As illustrated in FIGS. 1-3, in the stowed position, the first end 114 of the striker 106 may be outside of the interior passage 112. As discussed in detail below, the detent 108 may selectively retain the striker 106 in the stowed position. The striker 106 may move in the direction represented by arrow 118 when moved from the stowed position to the deployed position. In various embodiments, in the deployed position, the second end 116 may engage the container 102 (or a component of the container 102) to cause activation and/or opening of the sealed container 102. Optionally, in the deployed position, the first end 114 may be within the interior passage 112.

In some embodiments, and as best illustrated in FIG. 3, a biasing member 122 may optionally be included with the activation assembly 104 that biases the striker 106 towards the deployed position. The biasing member 122 may be various suitable devices or mechanisms as desired, including but not limited to a spring. In various embodiments, and as discussed in detail below, when the detent 108 is disengaged from the striker 106, the biasing member 122 may drive the striker 106 towards the container 102.

The detent 108 is configured to selectively engage the striker 106 and is movable between a first position and a second position. In the first position, and as illustrated in FIGS. 1-3, the detent 108 is engaged with the striker 106, and in the second position, the detent 108 is disengage from the striker 106. In various embodiments, movement of the detent 108 from the first position to the second position allows for the striker 106 to move from the stowed position to the deployed position. Optionally, and as illustrated in FIGS. 1-3, a detent biasing member 128, including but not limited to a spring, may be provided to bias the detent 108 towards the first position. In other embodiments, the detent biasing member 128 may be omitted.

Figure 5:
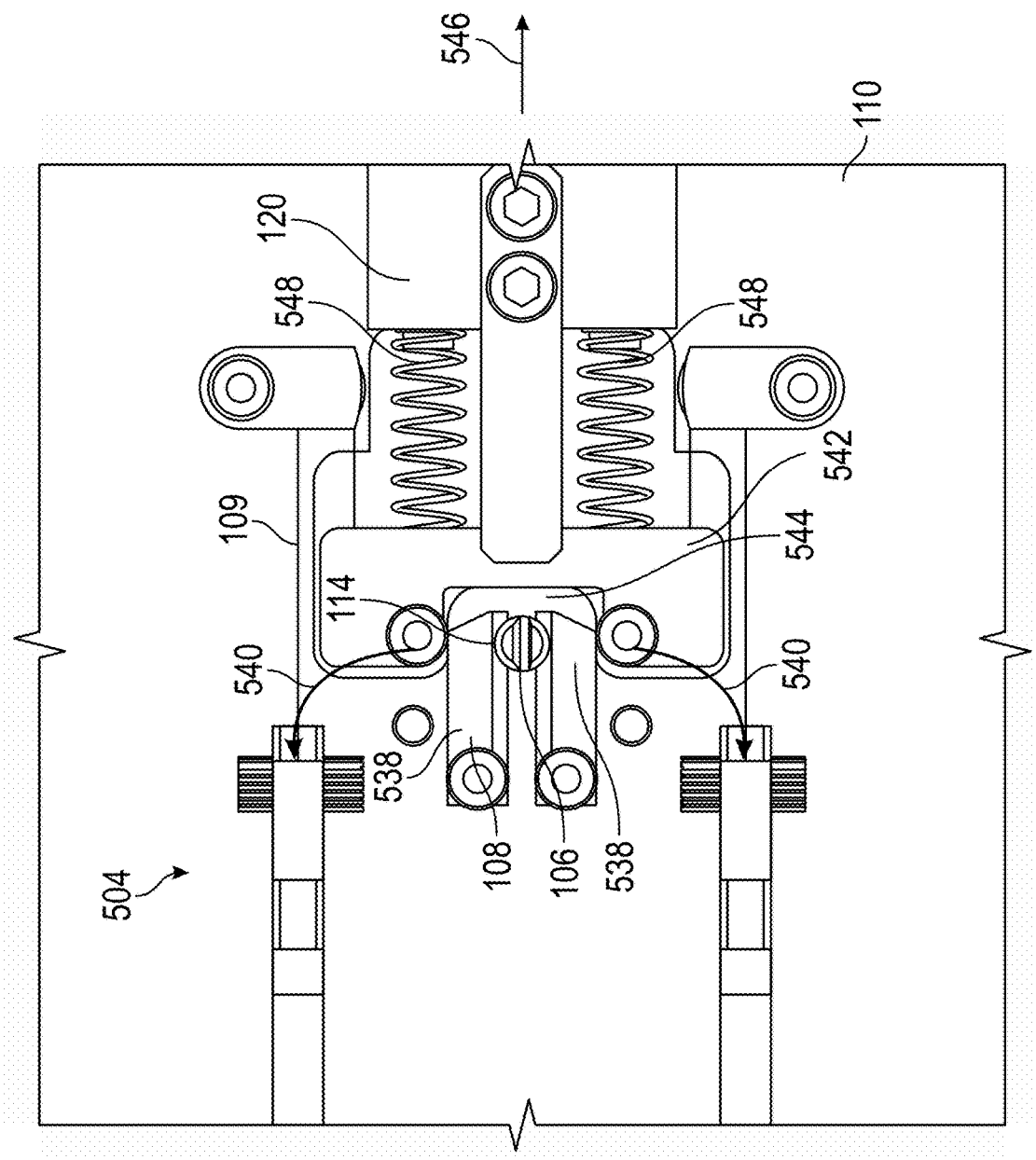
FIG. 5 is a top view of a sealed container with an activation assembly according to certain embodiments of the present invention.
Figure 6:
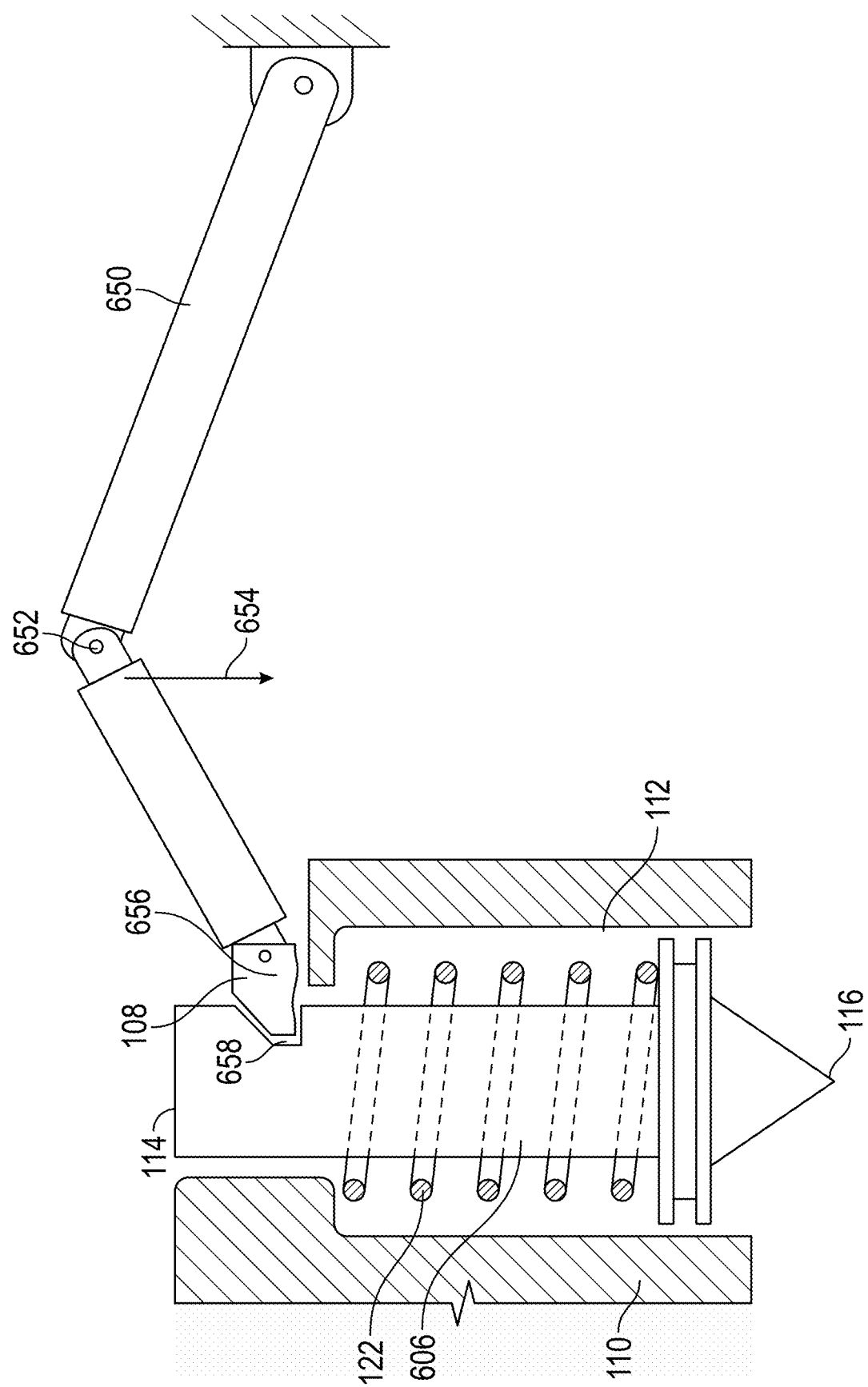
FIG. 6 is a sectional view of an activation assembly for a sealed container according to certain embodiments of the present invention.

The detent 108 may be various suitable devices or mechanisms for selectively engaging the striker 106 and/or selectively retaining the striker 106 in the stowed position. In the embodiment of FIGS. 1-3, the detent 108 is a slider 124 that is slidable and/or linearly movable relative to the holder 110 and/or the striker 106. Optionally, the slider 124 may be slidable in a direction that is substantially perpendicular to a direction of movement of the striker 106, although it need not be in other embodiments. Movement of the slider 124 from the first position to the second position is represented by arrow 126 in FIG. 3. In the embodiment of FIGS. 1-3, the detent biasing member 128 is provided between a support 120 of the holder 110 and the slider 124 such that the slider 124 is biased towards the first position. FIGS. 4-6 illustrate other non-limiting examples of detents 108 according to embodiments of the present invention and are discussed in greater detail below.

The SMA wire 109 is operably connected to the detent 108, either directly or indirectly, such that the detent 108 moves between the first position and the second position based on activation or deactivation of the SMA wire 109. The SMA wire 109 may be formed from various shape memory substances as desired, including but not limited to a metal, metal alloy, polymer, elastomer, or dielectric material. In various embodiments, a shape, length, and/or size of the SMA wire 109 may change responsive to the application of a stimulant such as heat from an electrical current. As a non-limiting example, in the embodiment of FIGS. 1-4, the length of the SMA wire 109 is shortened when the SMA wire 109 is activated. In some embodiments, an electrical current may be selectively provided to the SMA wire 109 to change the SMA wire 109 from the deactivated state to the activated state. In certain embodiments, the SMA wire 109 moves the detent 108 from the first position to the second position based on an activation of the SMA wire 109. In other embodiments, the SMA wire 109 moves the detent from the first position to the second position based on a deactivation of the SMA wire 109.

In the embodiment of FIGS. 1-3, the SMA wire 109 moves the detent 108 from the first position to the second position based on an activation of the SMA wire 109. In particular, in the embodiment of FIGS. 1-3, when an electrical current is provided, the SMA wire 109 shortens, thereby pulling the slider 124 away from the striker 106 and to the second position. In this embodiment, the shortening of the SMA wire 109 compresses the detent biasing member 128.

The SMA wire 109 may optionally be supported using one or more wire supports 130, although in other embodiments the wire supports 130 may be omitted. In the embodiment of FIGS. 1-3, the wire supports 130 are pulleys, although in other embodiments other suitable wire supports may be utilized as desired.

Optionally, the SMA wire 109 may be directly or indirectly communicatively coupled (e.g., via a controller) to a sensor such that the SMA wire 109 is selectively activated based on a characteristic or parameter detected by the sensor. As one non-limiting example, the sensor may be a breath sensor on an oxygen mask that is configured to detect breathing by a user, and the SMA wire 109 may be activated based on a detection of breathing. As another non-limiting example, the sensor may be a decompression sensor that detects the pressure in an environment, such as an aircraft cabin, and the SMA wire 109 may be activated based on a decompression event detected by the decompression sensor. As a further non-limiting example, the sensor may be a donning sensor on an oxygen mask, and the SMA wire 109 may be activated based on the donning sensor detecting that the oxygen mask is being worn. Other sensors may be used in other embodiments. In further embodiments a sensor may be omitted, and the SMA wire 109 may be selectively activated as desired.

FIG. 4 illustrates another example of an activation assembly 404 according to various embodiments. The activation assembly 404 is substantially similar to the activation assembly 104 except that the detent 108 includes a pair of ball bearings 432, each of which are biased towards a striker 406 of the activation assembly 404 by detent biasing members 128. The striker 406 is substantially similar to the striker 106 except that the striker 406 includes a notch or groove 434 that the ball bearings 432 selectively engage.

In the embodiment of FIG. 4, the striker 406 is initially retained in the stowed position by the ball bearings 432 that are biased towards the striker 406 and into engagement with the striker 406. The SMA wire (not shown in FIG. 4) of the activation assembly 404 may be heated (e.g., by providing an electrical current), which causes the SMA wire to shorten and apply a force 436 to the striker 406. In this embodiment, the force 436 applied is sufficient to overcome the spring force from the detent biasing members 128 holding the ball bearings 432 in place. In certain embodiments, the force 436 may at least partially cause the detent biasing members 128 to compress as the striker 406 is moved towards the deployed position. In various embodiments, the force 436 may be applied for a sufficient distance such that the force 436 and the spring force of the biasing member 122 are sufficient to overcome the force of the detent biasing members 128 and the striker 406 can move to the deployed position.

FIG. 5 illustrates another example of an activation assembly 504 according to various embodiments. The activation assembly 504 is substantially similar to the activation assembly 104 except that the detent 108 includes a pair of rails 538 that selectively engage the striker 106 to retain the striker 106 in the stowed position. Each rail 538 is rotatable about an axis that is offset from the striker. Arrows 540 in FIG. 5 represent rotation of the rails 538 from the first position to the second position.

In certain embodiments, the detent 108 of the activation assembly 504 also includes a slider 542 that selectively retains the rails 538 in the first position. Optionally, and as illustrated in FIG. 5, the slider 542 may include a receiving area 544 that selectively receives a portion of the rails 538 to prevent rotation of the rails 538 away from the striker 106 and to the second position. In some embodiments, the slider 542 is slidable and/or linearly movable relative to the holder 110 and/or the striker 106. Optionally, the slider 542 may be slidable in a direction that is substantially perpendicular to a direction of movement of the striker 106 and/or perpendicular to an axis of rotation of one of the rails 538, although it need not be in other embodiments. In various embodiments, the slider 542 is movable between a first position and a second position. FIG. 5 illustrates the slider 542 in the first position, and movement to the second position is represented by arrow 546. Optionally, one or more slider biasing members 548 may bias the slider 542 towards the first position of the slider 542. In certain embodiments, the slider 542 is movable between the first position and the second position of the slider 542 based on an activation or deactivation of the SMA wire 109. In the embodiment of FIG. 5, the slider 542 is moved from the first position to the second position based on an activation (and shortening) of the SMA wire 109.

In certain embodiments, in the first position, the slider 542 is proximate to the striker 106 and engages the rails 538, and in the second position, the slider 542 is spaced apart from the striker 106 and/or the rails 538 such that the rails 538 may rotate. Optionally, when the slider 542 is in the second position of the slider 542 (i.e., spaced apart from the rails 538), a spring force from the biasing member 122 acting on the striker 106 may be sufficient to force the striker 106 downwards, which in turn may force the rails 538 to rotate away from the striker 106 and towards the second position of the rails 538. In other optional embodiments, biasing members (not illustrated), may be provided to bias the rails 538 towards the second position. In these embodiments, the biasing members may cause rotation of the rails 538 away from the striker 106 after the slider 542 disengages the rails 538, thereby allowing the striker 106 to move from the stowed position to the deployed position (with or without the assistance of the biasing member 122).

FIG. 6 illustrates another example of an activation assembly 604 according to various embodiments. The activation assembly 604 includes a striker 606, which is substantially similar to the striker 106 except that a portion of the striker 606 includes a groove 658. The activation assembly 604 is substantially similar to the activation assembly 104 except that the detent 108 includes a linkage arm 650 with a wedge 656 and a point of rotation 652 between two linkages which passes through a point of inflection. The point of inflection is a point in space that is traveled though by the linkage where the force required to continue advancing drops to zero. In this embodiment, the SMA wire may be within the linkage arm 650 and/or otherwise connected to the linkage arm 650 to cause movement of the linkage arm 650 as described below. In certain embodiments, the linkage arm 650 is moved from a first position (illustrated in FIG. 6) to a second position based on an activation of the SMA wire. In this embodiment, when the SMA wire is heated and activated, the SMA wire shortens and applies a force 654 on the linkage arm 650 such that the linkage arm 650 is driven past the inflection point 652, which in turn causes the wedge 656 to move out of the groove 658 and away from the striker 606.

The activation assemblies described herein may provide a number of advantages compared to traditional systems. As a non-limiting example, the activation assemblies with the SMA wire may provide a compact mechanism for activation of a sealed container. The activation assemblies described herein may also be low weight and thereby provide weight savings, which may be important in certain industries such as the aviation industry. The activation assemblies described herein may be flexible or formable to a plurality of configurations such that the shape and/or components are optimized to provide compact activation assemblies. Compared to traditional systems, the activation assemblies described herein may have an increased service life and/or do not require special handling requirements. In some embodiments, the activation assemblies with the SMA wire may allow for the activation assemblies to be reusable. In certain aspects, the activation assemblies with the SMA wire. In addition, the activation assemblies described herein may improve the deployment of a mask by eliminating potential entanglement with lanyards. Various other improvements and advantages may be realized with the activation assemblies described herein, and the aforementioned advantages should not be considered limiting. Moreover, it will be appreciated that various other detents that are movable and/or otherwise controlled by a SMA wire may be utilized as desired to selectively retain a striker in a stowed position, and the aforementioned examples of detents should not be considered limiting on the disclosure. In other words, the detents may be additional devices in place of or in addition to the slider 124, the ball bearings 432, the rails 538, and/or the linkage arm 650.

A collection of exemplary embodiments are provided below, including at least some explicitly enumerated as "Illustrations" providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

Illustration 1. An activation assembly for a sealed container, the activation assembly comprising: a striker; a detent; and a shape memory alloy (SMA) wire configured to move the detent from a first position to a second position relative to the striker based on activation of the SMA wire, wherein, in the first position, the detent is engaged with the striker, and wherein, in the second position, the detent is disengaged from the striker and the striker is movable from a stowed position to a deployed position.

Illustration 2. The activation assembly of any preceding or subsequent illustrations or combination of illustrations, further comprising a biasing member biasing the striker towards the deployed position, and wherein, in the first position, the detent retains the striker in the stowed position.

Illustration 3. The activation assembly of any preceding or subsequent illustrations or combination of illustrations, wherein the detent comprises a slider, and wherein the slider is linearly movable between the first position and the second position relative to the striker based on activation of the SMA wire.

Illustration 4. The activation assembly of any preceding or subsequent illustrations or combination of illustrations, further comprising a slider biasing member biasing the slider towards the first position.

Illustration 5 The activation assembly of any preceding or subsequent illustrations or combination of illustrations, wherein the slider is linearly movable in a direction perpendicular to a direction of movement of the striker from the stowed position to the deployed position.

Illustration 6. The activation assembly of any preceding or subsequent illustrations or combination of illustrations, further comprising a plurality of pulleys supporting the SMA wire.

Illustration 7. The activation assembly of any preceding or subsequent illustrations or combination of illustrations, wherein the detent comprises a pair of rails, and wherein the rails are rotatable relative to the striker based on activation of the SMA wire.

Illustration 8. The activation assembly of any preceding or subsequent illustrations or combination of illustrations, further comprising a slider linearly movable relative to the rails, wherein the slider is configured to retain the rails in the first position, and wherein the slider is linearly moved based on activation of the SMA wire such that the slider disengages the rails and the rails move to the second position.

Illustration 9. The activation assembly of any preceding or subsequent illustrations or combination of illustrations, wherein the slider moves the rails to the second position.

Illustration 10. The activation assembly of any preceding or subsequent illustrations or combination of illustrations, wherein the rails are biased away from the striker.

Illustration 11. The activation assembly of any preceding or subsequent illustrations or combination of illustrations, wherein each rail of the pair of rails is rotatable about an axis offset from the striker.

Illustration 12. The activation assembly of any preceding or subsequent illustrations or combination of illustrations, wherein the detent comprises a bearing ball and a biasing member biasing the bearing ball towards the first position.

Illustration 13. The activation assembly of any preceding or subsequent illustrations or combination of illustrations, wherein the striker comprises a groove, and wherein the bearing ball is configured to engage the groove on the striker in the first position.

Illustration 14. The activation assembly of any preceding or subsequent illustrations or combination of illustrations, wherein the detent comprises a linkage arm comprising an inflection point.

Illustration 15. A sealed container system comprising the sealed container and the activation assembly of any preceding or subsequent illustrations or combination of illustrations, wherein the sealed container comprises at least one of a chemical oxygen generator or a sealed gas cylinder.

Illustration 16. An activation assembly for a sealed container, the activation assembly comprising: a striker movable between a stowed position and a deployed position; a biasing member biasing the striker towards the deployed position; a detent configured to engage the striker and retain the striker in the stowed position; and a shape memory alloy (SMA) wire connected to the detent, wherein the SMA wire is adjustable between an activated configuration and a deactivated configuration, and wherein, in the activated configuration, the SMA wire disengages the detent from the striker such that the biasing member moves the striker from the stowed position to the deployed position.

Illustration 17. The activation assembly of any preceding or subsequent illustrations or combination of illustrations, wherein the detent comprises a slider that is linearly movable relative to the striker and in a direction perpendicular to the direction of movement from the stowed position to the deployed position of the striker.

Illustration 18. The activation assembly of any preceding or subsequent illustrations or combination of illustrations, wherein the detent comprises at least one of a rotatable rail, a biased ball detent, or a linkage arm comprising an inflection point.

Illustration 19. An activation assembly for a sealed gas container or a chemical oxygen generator, the activation assembly comprising: a striker; a detent; and a shape memory alloy (SMA) wire connected to the detent and configured to selectively move the detent relative to the striker, wherein, in a deactivated configuration of the SMA wire, the detent is engaged with the striker, and wherein, in an activated configuration of the SMA wire, the detent is disengaged from the striker.

Illustration 20. The activation assembly of any preceding or subsequent illustrations or combinations of illustrations, wherein the striker is movable between a stowed position and a deployed position, wherein the activation assembly further comprises a biasing member configured to bias the striker towards the deployed position, and wherein, in the deactivated configuration, the detent is engaged with the striker such that the striker is retained in the stowed position.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. An activation assembly for a sealed container, the activation assembly comprising:
    a striker;
    a detent, wherein the detent comprises a linkage arm comprising an inflection point; and
    a shape memory alloy (SMA) wire configured to move the detent from a first position to a second position relative to the striker based on activation of the SMA wire,
    wherein, in the first position, the detent is engaged with the striker, and
    wherein, in the second position, the detent is disengaged from the striker and the striker is movable from a stowed position to a deployed position.

2. The activation assembly of claim 1, further comprising a biasing member biasing the striker towards the deployed position, and wherein, in the first position, the detent retains the striker in the stowed position.

3. A sealed container system comprising the sealed container and the activation assembly of claim 1, wherein the sealed container comprises at least one of a chemical oxygen generator or a sealed gas cylinder.

4. An activation assembly for a sealed container, the activation assembly comprising:
    a striker;
    a detent; and
    a shape memory alloy (SMA) wire configured to move the detent from a first position to a second position relative to the striker based on activation of the SMA wire,
    wherein, in the first position, the detent is engaged with the striker, and
    wherein, in the second position, the detent is disengaged from the striker and the striker is movable from a stowed position to a deployed position,
    wherein the detent comprises a pair of rails, and wherein each rail of the pair of rails is rotatable about a rotation axis relative to the striker based on activation of the SMA wire, and
    wherein the activation assembly further comprises a slider linearly movable relative to the rails, wherein the slider is configured to retain the rails in the first position, and wherein the slider is linearly moved based on activation of the SMA wire such that the slider disengages the rails and the rails move to the second position.

5. The activation assembly of claim 4, wherein the slider moves the rails to the second position.

6. The activation assembly of claim 4, wherein the rails are biased away from the striker.

7. The activation assembly of claim 4, wherein each rail of the pair of rails is rotatable about an axis offset from the striker.

8. An activation assembly for a sealed container, the activation assembly comprising:
    a striker movable between a stowed position and a deployed position;
    a biasing member biasing the striker towards the deployed position;
    a detent configured to engage the striker and retain the striker in the stowed position; and
    a shape memory alloy (SMA) wire connected to the detent, wherein the SMA wire is adjustable between an activated configuration and a deactivated configuration, and wherein, in the activated configuration, the SMA wire disengages the detent from the striker such that the biasing member moves the striker from the stowed position to the deployed position, wherein the detent comprises a slider that is linearly movable relative to the striker and in a direction perpendicular to a direction of movement from the stowed position to the deployed position of the striker based on the SMA wire.

9. The activation assembly of claim 8, wherein the detent further comprises at least one of a rotatable rail, a biased ball detent, or a linkage arm comprising an inflection point.

10. The activation assembly of claim 8, further comprising a slider biasing member biasing the slider towards the stowed position.

11. The activation assembly of claim 8, further comprising a plurality of pulleys supporting the SMA wire.

* * * * *